US012137028B2

(12) United States Patent
Dreyer et al.

(10) Patent No.: US 12,137,028 B2
(45) Date of Patent: *Nov. 5, 2024

(54) EDGE COMPUTE ENVIRONMENT CONFIGURATION TOOL FOR A COMMUNICATIONS NETWORK

(71) Applicant: CenturyLink Intellectual Property LLC, Broomfield, CO (US)

(72) Inventors: Bryan J. Dreyer, Bellevue, WA (US); William G. Roemhild, Sumner, WA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,740

(22) Filed: Nov. 24, 2023

(65) Prior Publication Data

US 2024/0089172 A1    Mar. 14, 2024

Related U.S. Application Data

(63) Continuation of application No. 17/388,610, filed on Jul. 29, 2021, now Pat. No. 11,831,500.

(Continued)

(51) Int. Cl.
*G06F 15/177* (2006.01)
*H04L 41/08* (2022.01)
(Continued)

(52) U.S. Cl.
CPC ...... *H04L 41/0816* (2013.01); *H04L 41/0883* (2013.01); *H04L 41/22* (2013.01)

(58) Field of Classification Search
CPC .. H04L 41/0816; H04L 41/0883; H04L 41/22
See application file for complete search history.

(56) References Cited

U.S. PATENT DOCUMENTS 6,286,038 B1 * 9/2001 Reichmeyer ........ H04L 41/0883
709/222
8,918,631 B1   12/2014 Kumar
(Continued)

OTHER PUBLICATIONS

International Preliminary Report on Patentability, dated Feb. 9, 2023, Int'l Appl. No. PCT/US2021/043660, Int'l File Date Jul. 29, 2021; 9 pgs.

(Continued)

*Primary Examiner* — Duyen M Doan

(57) ABSTRACT

A tool is provided to configure an edge compute environment of a network. The edge compute configuration tool may generate a configuration process for instantiating an edge compute environment at an edge site of a network including configuring one or more of the components of the edge compute environment. The configuration process may be based on seeding data and/or information provided to the edge compute configuration tool via a user interface and/or from one or more databases associated with the network. The configuration process may further include generating automatically executed configuration instructions that communicate with the devices of the edge compute environment to configure operational processes of the devices, provision communication ports, establish one or more network addresses with the devices, etc. In some instances, the edge compute configuration tool may execute one or more microservices to communicate with and control configuration of the devices of the edge compute environment.

20 Claims, 14 Drawing Sheets

Related U.S. Application Data

(60) Provisional application No. 63/059,007, filed on Jul. 30, 2020.

(51) Int. Cl.
  *H04L 41/0816* (2022.01)
  *H04L 41/22* (2022.01)

(56) References Cited

U.S. PATENT DOCUMENTS

| | | |
|---|---|---|
| 10,833,961 B1 | 11/2020 | Nalluri |
| 10,972,362 B2 * | 4/2021 | Tang ................. H04L 41/08 |
| 2002/0158898 A1 | 10/2002 | Hsieh |
| 2004/0261114 A1 | 12/2004 | Addington |
| 2016/0087835 A1 | 3/2016 | Mulligan |
| 2019/0068449 A1 | 2/2019 | Sikand |
| 2019/0129745 A1 * | 5/2019 | Wang ................. G06F 9/45558 |
| 2020/0014587 A1 * | 1/2020 | Cheloff ............. G06Q 20/3278 |
| 2020/0068019 A1 * | 2/2020 | Tezuka ................. G16Y 20/10 |
| 2021/0058386 A1 * | 2/2021 | Peter ................. H04L 63/0823 |
| 2022/0038340 A1 | 2/2022 | Dreyer |

OTHER PUBLICATIONS

International Search Report and Written Opinion of the International Searching Authority, dated Oct. 25, 2021, Int'l Appl. No. PCT/US21/043660; Int'l Filing Date Jul. 29, 2021; 13 pgs.

* cited by examiner

FIG.12

| Interface Standard | Device Function | Device Interface | Remote Interface | Remote Function | Set Description From LLDP | Network Ready Requirement | | |
|---|---|---|---|---|---|---|---|---|
| Minerlab EM001 | EM001 | xe-0/2/0 | xe-0/0/32 | QH001 | false | true | Edit | Delete |
| Minerlab EM001 | EM001 | xe-0/2/1 | xe-0/0/32 | QH002 | false | true | Edit | Delete |
| Minerlab EM001 | EM001 | me0 | ANY | ANY | true | true | Edit | Delete |
| Minerlab EM002 | EM002 | xe-0/2/0 | xe-0/0/32 | QH003 | false | true | Edit | Delete |
| Minerlab EM002 | EM002 | xe-0/2/1 | xe-0/0/32 | QH004 | false | true | Edit | Delete |
| Minerlab EM002 | EM002 | me0 | ANY | ANY | true | true | Edit | Delete |
| Minerlab QH001 | QH001 | et-0/0/26 | et-0/0/0 | QS001 | false | true | Edit | Delete |
| Minerlab QH001 | QH001 | et-0/0/27 | et-0/0/1 | QS001 | false | true | Edit | Delete |
| Minerlab QH001 | QH001 | et-0/0/28 | et-0/0/2 | QS001 | false | true | Edit | Delete |
| Minerlab QH001 | QH001 | et-0/0/29 | et-0/0/0 | QS002 | false | true | Edit | Delete |

Showing 1 to 10 of 290 entries

Previous 1 2 3 4 5 .. 29 Next

1400

Revenue Port Configuration

Existing Revenue Port Configurations – Site ID — 1404

| Configuration | Starting Port | Count | | |
|---|---|---|---|---|
| Configuration Type A | 0 | 8 | Edit | Delete |

← 1406

Choose Configuration to Add    Search: [          ]

Available Interface Port Configurations

| | |
|---|---|
| Configuration Type A | Add |
| Configuration Type B | Add |
| Configuration Type C | Add |
| Configuration Type D | Add |
| Configuration Type E | Add |
| Configuration Type F | Add |
| Configuration Type G | |
| Configuration Type H | |

↑ 1402    ↑ 1408

1410

Switch Interface Map                                      [Close]

| Interface | Configuration | Chassis Number |
|---|---|---|
| et-0/0/0:0 | Configuration Type A | 1 |
| et-0/0/0:1 | Configuration Type A | 1 |
| et-0/0/0:2 | Configuration Type A | 1 |
| et-0/0/0:3 | Configuration Type A | 1 |
| et-0/0/1:0 | Configuration Type A | 1 |
| et-0/0/1:1 | Configuration Type A | 1 |
| et-0/0/1:2 | Configuration Type A | 1 |
| et-0/0/1:3 | Configuration Type A | 1 |
| et-0/0/2:0 | Configuration Type A | 2 |
| et-0/0/2:1 | Configuration Type A | 2 |
| et-0/0/2:2 | Configuration Type A | 2 |
| et-0/0/2:3 | Configuration Type A | 2 |
| et-0/0/3:0 | Configuration Type A | 2 |
| et-0/0/3:1 | Configuration Type A | 2 |
| et-0/0/3:2 | Configuration Type A | 2 |

FIG.14

EDGE COMPUTE ENVIRONMENT CONFIGURATION TOOL FOR A COMMUNICATIONS NETWORK

TECHNICAL FIELD

Embodiments of the present invention generally relate to systems and methods for implementing a telecommunications network, and more specifically for a system to automatically configure an edge compute environment at an edge site of a telecommunications network.

BACKGROUND

Telecommunications networks may provide many services to customers or devices connected to the network, including transmission of communications between network devices, network services, remote computing environments, cloud services (such as storage services, networking service, compute services, etc.), and the like. Such telecommunications networks generally include interconnected devices and/or components that are configured to communicate with each other and/or customer devices to provide access to the available services from the network. Typically, configuration of devices and interconnections of the network require a network engineer to remotely or locally access network components and manually configure settings, ports, operating systems, and the like to enable the network to provide services to customers. In some instances, the configuration of network devices includes multiple network administrators and other groups to manually configure the devices. For example, configuration of some network services may require a first network administrator to log into one or more components associated with the services separately after installation of the components into the network and provide one or more inputs via a workstation or other computing device to configure the components according to a service plan as a single step in the overall service configuration process. The first network administrator may then notify another group or administrator of the completion of a step in the configuration process so that the next step in the process may be executed by the second network administrator, and so on. Such a process can be time consuming, require steps or acts from multiple network groups, and includes multiple potential points of delay or errors that must be identified and corrected before the network service is available to the customer.

It is with these observations in mind, among other, that aspects of the present disclosure were conceived.

Summary

One aspect of the present disclosure relates to a method for managing a communications network. The method may include the operations of obtaining, from a plurality of databases, site information associated with an edge site of the communications network, wherein each of the plurality of databases is associated with a different backbone communications network and generating, based on the site information associated with the edge site of the communications network, a configuration process for instantiating a compute service available from the edge site, the configuration process comprising a set of instructions for configuring an operational status of at least one network edge device of the edge site to provide the compute service to a requesting device in communication with the edge site. The method may also include the operation of configuring, based on the configuration process, the at least one network edge device to provide the compute service Another aspect of the present disclosure relates to an apparatus comprising a processing device and a non-transitory computer-readable medium encoded with instructions that, when executed by the processing device, cause the processing device to execute one or more operations. Such operations may include communicating with a plurality of databases to obtain site information associated with an edge site of the communications network, wherein each of the plurality of databases is associated with a different backbone communications network, generating, based on the site information associated with the edge site of the communications network, a configuration process for instantiating a compute service available from the edge site, the configuration process comprising a set of instructions for configuring an operational status of at least one network edge device of the edge site, and configuring, based on the configuration process, the at least one network edge device to provide the compute service Yet another aspect of the present disclosure relates to a tangible, non-transitory, computer-readable media having software encoded thereon, the software, when executed by a processor, operable to communicate with a plurality of databases to obtain site information associated with an edge site of the communications network, wherein each of the plurality of databases is associated with a different backbone communications network and generate, based on the site information associated with the edge site of the communications network, a configuration process for instantiating a compute service available from the edge site, the configuration process comprising a set of instructions for configuring an operational status of at least one network edge device of the edge site to provide the compute service to a requesting device in communication with the edge site. The software may be further operable to transmit, to the at least one network edge device and based on the configuration process, at least one instruction to configure the at least one network edge device to provide the compute service.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

FIG. 12 is an example user interface displaying data and configuration progress for multiple interfaces associated with an edge compute environment configuration in accordance with one embodiment.

FIG. 14 is an example user interface for providing port configuration data and information for a device of an edge compute environment configuration in accordance with one embodiment.

DETAILED DESCRIPTION

Figure 1:
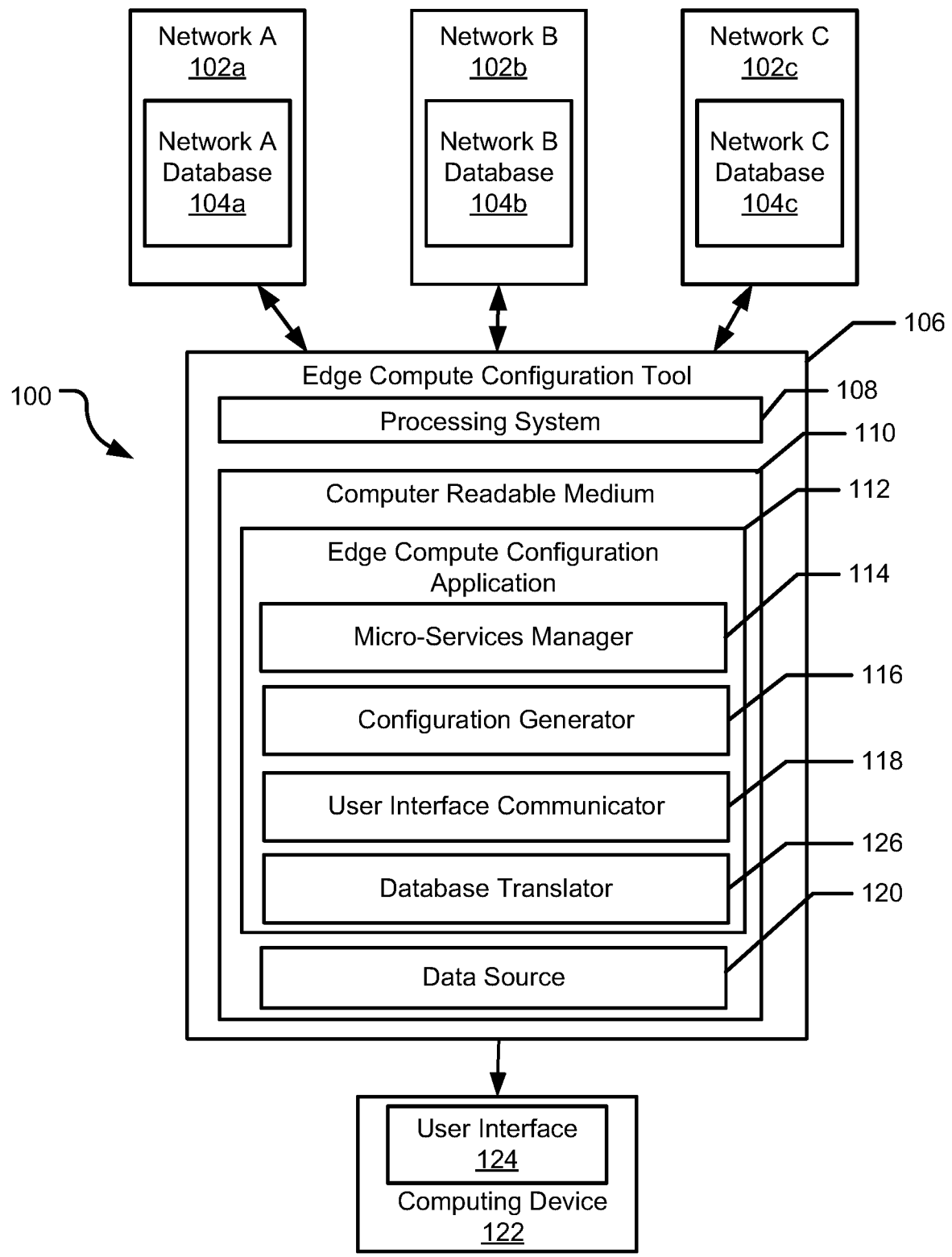
FIG. 1 is a schematic diagram illustrating a system for configuring an edge compute environment at an edge of a network in accordance with one embodiment.

Aspects of the present disclosure involve a tool for configuring an edge compute environment of a network, such as a communications network or other computing environment. In one instance, the edge compute configuration tool may generate a configuration process for instantiating an edge compute environment at an edge site of a network. The process may involve configuring one or more of the components of the edge compute environment. The configuration process may be based on seeding data and/or information provided to the edge compute configuration tool via a user interface and/or from one or more databases associated with the network. The configuration process may further include generating or otherwise providing automatically executed configuration instructions or steps that communicate with the devices of the edge compute environment to configure operational processes of the devices, provision communication ports and interfaces between the devices, establish one or more network addresses with the devices, and the like. In general, any operation performed at the device or in the broader network may be included in the configuration process to instantiate an edge compute service in an edge site of the network. In some instances, the edge compute configuration tool may access and manage one or more micro-services to communicate with and control configuration of the devices of the edge compute environment. Through the configuration process, compute services may be provided to customers of the network via the network edge site. Providing compute services from devices or environments located at the edge of the network may reduce the latency experienced at customer devices or networks during use of the compute services.

In one particular instance, a user interface may be associated with the edge compute configuration tool. The user interface may include one or more portions through which seeding data and/or information for the edge compute environment may be provided. The user interface may be displayed on a computing device and may interact with a user of the computing device, the computing device itself, or a different computing device to receive the seeding information. The edge compute configuration tool may also display information of the edge compute environment via the user interface, including information of the devices of the environment, information of communication or interfacing standards used by the environment, network infrastructure and interconnection information and the like. Alterations to such information may be accessed and provided via the user interface. In still other instances, the generated configuration process may include reporting and/or logging of a configuration status of the devices of the edge compute environment. For example, one or more of the devices of the edge compute environment may provide a report of a configuration status to the edge compute configuration tool indicating a successful configuration or a failed configuration. The edge compute configuration tool may display the status information for the configuration via the user interface and one or more actions may be executed in response to the displayed status information. Through the edge compute configuration tool, configuration of an edge compute environment of a network may be executed quickly and reliably for providing compute services to customers of a network edge site.

FIG. 1 is a schematic diagram illustrating a system 100 for configuring an edge compute environment at an edge or edge site of a network in accordance with one embodiment. In general, the system 100 may include an edge compute configuration tool 106 in communication with a source of information such as one or more network databases 104*a-c* associated with one or more respective backbone networks 102*a-c*. The various backbone networks 102*a-c* associated with the system 100 may include both public communication networks (such as the Internet) and/or private communication networks (such as a virtual private network (VPN) or other type of private network). The edge compute configuration tool 106 may also be in communication with a computing device 122 providing a user interface 124. The interactions and communications between the components of the edge compute configuration system 100 is described in more detail herein.

As explained above, the edge compute configuration tool 106 may access and configure one or more network devices associated with an edge site of a network or networks to provide compute services from the edge site. By providing the compute services from the edge of the network or networks, such services may be provided with minimal or reduced latency in receiving the services from the network. In some instances, the edge compute configuration tool 106 may include an edge compute configuration application 112 executed to perform one or more of the operations described herein. The edge compute configuration application 112 may be stored in a computer readable media 110 (e.g., memory)

and executed on a processing system 108 of the edge compute configuration tool 106 or other type of computing system, such as that described below. For example, the edge compute configuration application 112 may include instructions that may be executed in an operating system environment, such as a Microsoft Windows™ operating system, a Linux operating system, or a UNIX operating system environment. The computer readable medium 110 includes volatile media, nonvolatile media, removable media, non-removable media, and/or another available medium. By way of example and not limitation, non-transitory computer readable medium 110 comprises computer storage media, such as non-transient storage memory, volatile media, nonvolatile media, removable media, and/or non-removable media implemented in a method or technology for storage of information, such as computer readable instructions, data structures, program modules, or other data.

The edge compute configuration application 112 may also utilize a data source 120 of the computer readable media 110 for storage of data and information associated with the edge compute configuration tool 106. For example, the edge compute configuration application 112 may store information associated one or more networks 102*a-c* over which a communications or data path may be defined. In general, any data or information utilized by the edge compute configuration application 106 may be stored and/or retrieved via the data source 120. In one particular implementation, seeding information or other data may be received via a user device 122 (described in more detail below) and/or one or more network databases 104*a-c* and stored in the data source 120 for use in configuring components of an edge compute environment.

The edge compute configuration application 112 may include several components to perform one or more of the operations described herein. For example, a database translator 126 may be included in the edge compute configuration application 112 to translate network information obtained from the databases 104*a-c* associated with one or more communication networks 102. In the example shown in FIG. 1, the edge compute configuration tool 106 may communicate with a database 104*a* associated with a network A 102*a*, a database 104*b* associated with a network B 102*b*, and a database 104*c* associated with a network C 102*c*. The edge compute configuration tool 106 may communicate with more or fewer such databases 104*a-c* in more or fewer networks 102*a-c*. In general, each of the networks 102 comprise a collection of interconnected network components to transmit messages or packets within the networks and may include both public and/or private network portions. In some instances, however, network operators may purchase existing networks and integrate those networks into a main network to expand the geographical footprint of the main network. These purchased or obtained networks may include databases 104 with network component information, such as component locations, interconnectivity information, component types, port assignments of the components, and the like. In addition, each network 102 may maintain or store the network component information in a particular format in the associated database 104 or databases for that network. Such formats may vary from network to network such that information stored in a first database, such as database 104*a*, may be in a first format while information stored in a second database, such as database 104*b*, may be in a second format different than the first format.

As the network information in the various network databases 104 in communication with the edge compute configuration tool 106 may be stored in various formats, the database translator 126 of the edge compute configuration application 112 may translate the network information from the databases 104 into a common format and store the translated information in data source 120. In some instances, the database translator 126 may translate the network information prior to storage in the data source 120. In another implementation, the network information may be stored in the data source 120 as obtained from the respective database 104 and translated when accessed by the application 112 during edge compute configuration. Regardless, the database translator 126 may be configured to identify a format of stored network information and translate the obtained stored information to the common format.

The edge compute configuration application 112 may also include a user interface communicator 118 to communicate with a computing device 122 executing a user interface program 124. The computing device 122 may provide the user interface (e.g., a command line interface (CLI), a graphical user interface (GUI), etc.) 124 displayed on a display, such as a computer monitor, for displaying data. Through the user interface 124, a user may provide control inputs for manipulating the edge compute configuration application 112 through one or more input devices. For example, identification of network devices, edge sites, device requests, port and bandwidth requests, and other seeding information and data may be provided via inputs to the user interface 124 and used by the edge compute configuration application 112 to, among other things, configure components of an edge site to provide edge compute services to customers of the network. The input device for providing the inputs to the user interface 124 may include, among others and not limited to, a keyboard or a pointing device (e.g., a mouse, trackball, pen, or touch screen) to enter data into or interact with the user interface.

The edge compute configuration tool 106 may also include a configuration generator 116 for constructing or generating a configuration plan or series of executable steps for configuring network devices or other computing devices to providing edge compute services from an edge site of a network or collection of networks. In general, the configuration generator 116 receives seed data or information for an edge compute environment via the user interface 124, the network databases 104*a-c*, and/or the data source 120 and generates a list of operations or configuration steps for configuring components of the edge site to provide the compute services. One or more of the operations of the configuration generator 116 are described in more detail below with reference to the method 300 of FIG. 3. The edge compute configuration application 112 may, in some instances, execute one or more of the configuration plan generated by the configuration generator 116 to configure the edge compute system or environment. In one example, execution of the configuration plan may include calling or executing one or more micro-services to configure components of the edge compute system. As such, the edge compute configuration application 112 may include a micro-services manager 114 to manage the various micro-services executed during configuration of edge devices to provide the compute services. In general, micro-services manager 114 may call, manage, respond, and terminate micro-services executed by the edge compute configuration application 112 during configuration of edge devices of a network or group of networks.

It should be appreciated that the components described herein are provided only as examples, and that the application 112 may have different components, additional components, or fewer components than those described herein. For example, one or more components as described in FIG. 1 may be combined into a single component. As another example, certain components described herein may be encoded on, and executed on other computing systems, such as on one remotely coupled to path computation tool 106.

Figure 2:
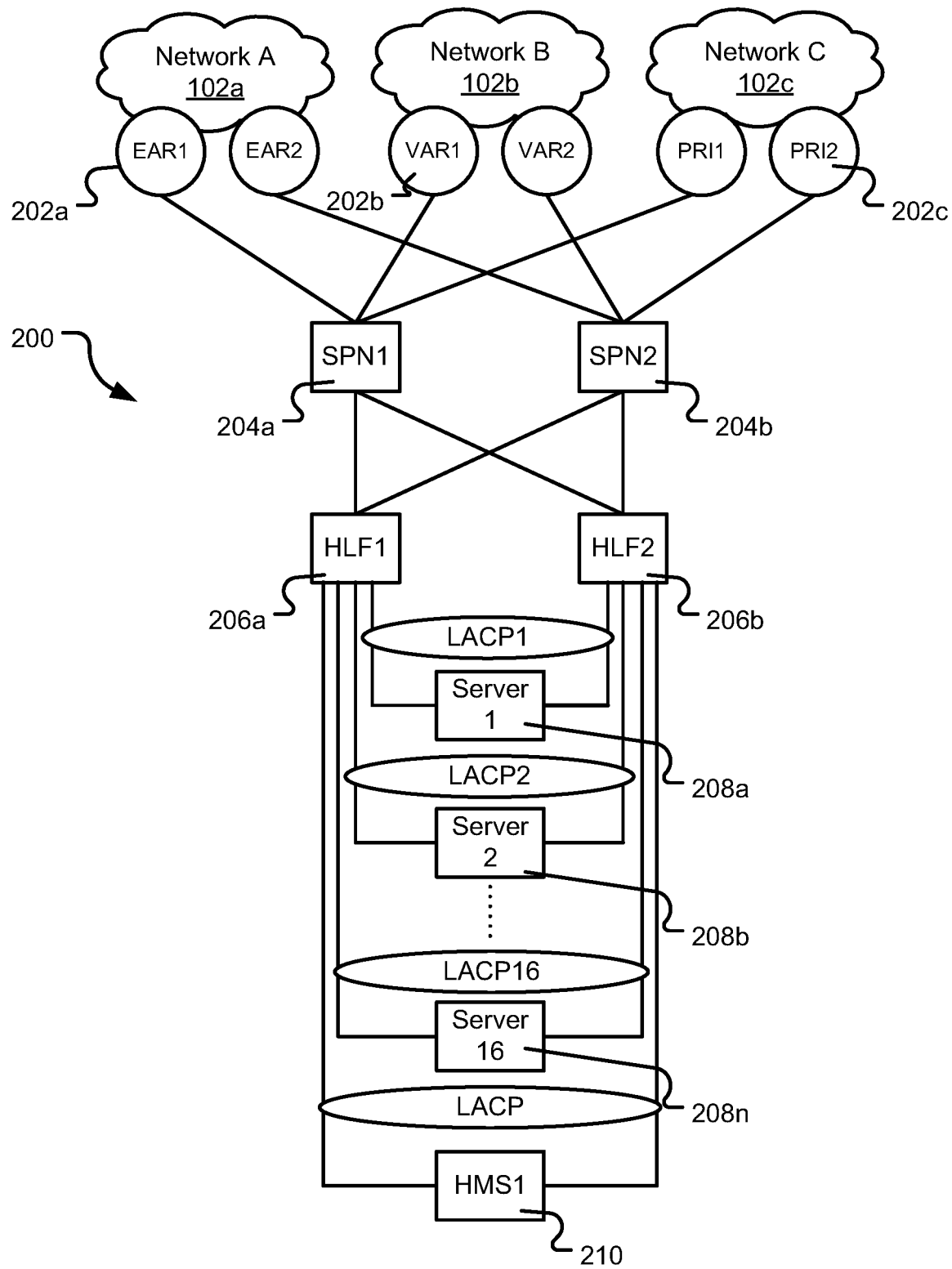
FIG. 2 is a schematic diagram illustrating an edge compute environment of a network in accordance with one embodiment.

FIG. 2 is a schematic diagram illustrating an edge compute environment 200 of an edge site of a network in accordance with one embodiment. In general, the edge compute environment 200 of FIG. 2 illustrates one example of components of an edge site of a network or collection of networks 102a-102c from which compute services may be provided to customers connected or otherwise in communication with the edge site. As mentioned above, by providing the environment 200 in an edge site of the network 102, compute services may be provided to customers with a smaller latency than if the compute environment is included deeper within the network or further away from the requesting customer for the compute services. It should be appreciated, however, that an edge compute system may include more or fewer components than those illustrated in FIG. 2 and may be connected in other configurations than shown. Rather, the system 200 of FIG. 2 is but one example of an edge compute system 200 for providing compute services to devices or networks connected to or otherwise in communication with the edge compute system.

In the instance shown, the components of the system 200 may be installed or associated with a network site at the edge of one or more networks 102a-c. In general, an edge site of a network is a network site in which customer equipment may connect to the network 102 for access to services and transmission routes of the network. Further and as discussed above, the network 102 may include more than one public and/or private networks interconnected to form a general network 102. Each network instance may include one or more network gateway edge devices 202 that provide gateways or ingress/egress devices for the associated network. In FIG. 2, network 102a may include edge devices 202a, network 102b may include edge devices 202b, and network 102c may include edge devices 202c. Each edge device 202 of the networks 102 may connect or otherwise communicate with one or more spine switch devices 204a-b. The spine switch devices 204a-b provide an interface between the edge devices of the networks 102a-c to other components, such as host servers, that provide the compute services discussed herein. Each of the spine switch devices 204a-b may be interconnected with one or more host leaf switches 206a-b to form a switch mesh for connecting to the network 102 via edge devices 202. In some instances, more or fewer spine switch devices 204 and/or host leaf switches 206 may be included in the edge compute environment 200. However, the environment 200 of FIG. 2 is illustrated to provide redundancy failover services for each of the components of the environment. In particular, spine switch 2 204b may be a failover, redundant device for spine switch device 1 204a. Each host leaf switch 206a-b may similarly be a failover, redundant device for another host leaf switch.

The environment 200 may also include one or more application servers 208a-n or other types of servers connected to each host leaf switch 206a-b through a corresponding link aggregation control protocol (LACP) which combines multiple network connections in parallel to increase throughput. In one implementation, the servers 208 may host and execute applications to provide particular services to customers of the network 102. For example, the servers 208 may be configured to provide compute services (as well as other cloud computing services) to customers in communication with the servers. Further, although the environment 200 is illustrated with sixteen such servers 208, the environment 200 may include more or fewer servers for providing services to customers. The environment 200 may, in some instances, also include a host management switch 210 connected to the host leaf switches 206 for managing aspects of the switching mesh and communications to/from the servers 208. Through the environment 200 of FIG. 2, an edge compute service may be provided to customers of the network 102 requesting such services from the network 102 while reducing the latency of providing the services to the customers.

Figure 3:
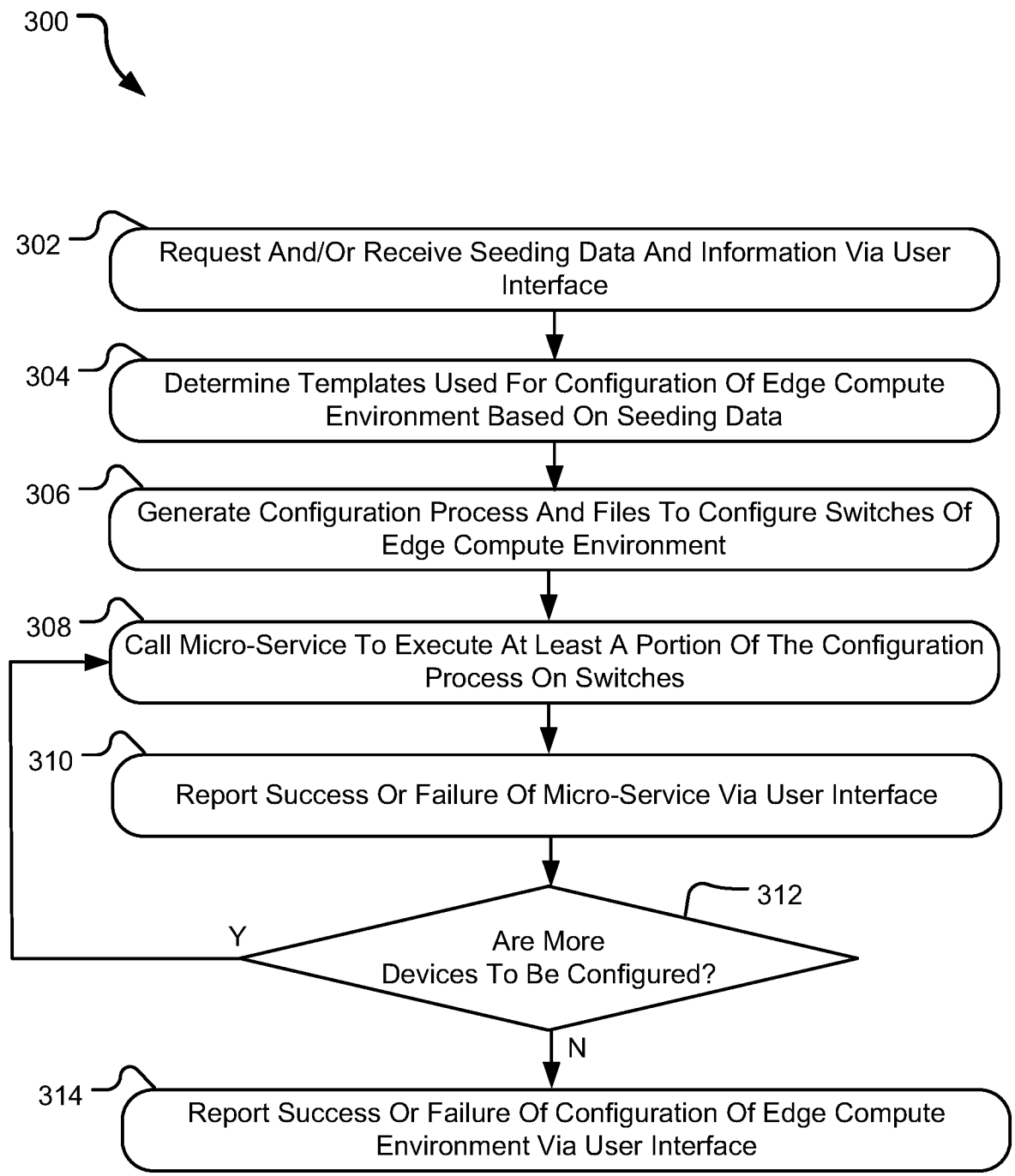
FIG. 3 is a flowchart illustrating a method for configuring an edge compute environment at an edge of a network in accordance with one embodiment.

FIG. 3 is a flowchart illustrating a method 300 for configuring an edge compute environment at an edge of a network in accordance with one embodiment. In one implementation, one or more of the operations of the method 300 may be performed by the edge compute configuration application 112 and, in particular, by the configuration generator 116 of the application. In other implementations, one or more of the operations may be performed by other components of the edge compute configuration tool 106 or still other systems. The operations may be executed by hardware components of the relevant systems, software programs of the systems, or a combination of hardware and software components of the systems.

Figures 4, 5:
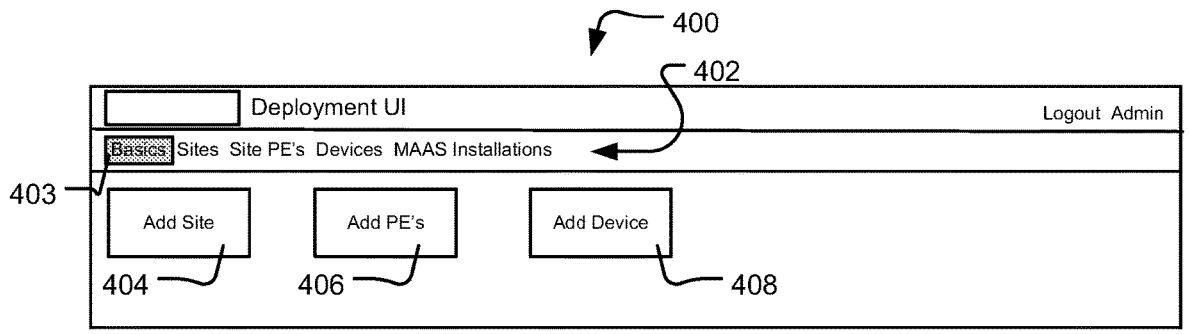
FIG. 4 is an example user interface for providing seeding data and information for an edge compute environment configuration in accordance with one embodiment.
FIG. 5 is an example user interface for providing new site seeding data and information for an edge compute environment configuration in accordance with one embodiment.

Beginning in operation 302, the edge compute configuration tool 106 may request and/or receive seeding data or information used to generate the edge compute configuration process for configuring the components of the edge compute environment 200. In general, the seeding data may include any information of the network, the edge site, and/or the installed components at the edge site for providing edge compute services to customers connected to the edge site or other location serviced by the network. In one particular instance, the seeding data or information may be provided via the user interface 124 displayed on the computing device 122. For example, FIG. 4 is an example user interface 400 for providing seeding data and information for an edge compute environment 200 configuration in accordance with one embodiment. The user interface 400 may be displayed on a display device associated with computing device 122 operated by a customer, network administrator, network engineer, edge site manager or technician, and the like. Through the user interface 124, a user of the computing device 122 may provide the seeding information for generating the edge compute service infrastructure. In still other instances, another computing device may access and utilize the user interface 124 for providing the seeding information to the edge compute configuration tool 106.

The user interface 400 of FIG. 4 may be a landing page for the interface. To provide the seeding data and information, a selection or other indication of a "Basics" tab 403 in a row of control tabs 402 may be received. Upon selection of the Basics tab 403, one or more active buttons 404-408 for providing seeding information may be displayed. In one particular implementation, the buttons may include an "Add Site" button 404 for adding a new edge site identifier or other information associated with a new edge site of the network, an "Add PE's" button 406 for adding a new provider edge device or devices, and an "Add Device" button for adding other new devices at the edge site to the network. More or fewer buttons may be included in the user interface 400 as needed to request or receive seeding information for generating an edge compute system configuration. In one example and upon selection of the Add Site button 404, the user interface 122 may display screenshot 500 as illustrated in FIG. 5 and which includes one or more information boxes through which site-specific information may be provided to add to the data source 120 of the edge compute configuration tool 106 and associated with an edge site of a network.

The new site screen 500 may, in one instance, include one or more boxes for a user or computing device to enter site identification information. For example, the interface 500 may include a box 502 for entry of a Common Language Location Identifier (CLLI) code associated with a location of the new site. In general, CLLI codes may be used by networks to identify a geographic location associated with the network, such as a geographic location of a network device and/or site. A box 504 for entry of a site name and a box 506 for an identification of a location (such as city and state identifiers, a physical address, geographic coordinate values, etc.) of the site may also be included. Additional site information may also be provided via the user interface 500 used to manage at least portions of the site components. For example, a management subnet box 508 may be included for providing a range of Internet Protocol (IP) addresses used to access and manage components of the edge site. The range of IP addresses may therefore be associated with devices of the identified new site and through which such devices may be accesses (such as by a network administrator) and configured. In some instances, a secondary management subnet box 510 may also be included for identifying a second IP address range used to access devices of the edge site.

Still other IP address ranges may be specified or provided via the user interface 500 as associated with a new edge site of the network being input through the user interface, such as an IP address range included in a box 512 for identifying a range of IP addresses for a GMSN subnet of the edge site and/or a box 514 for identifying an IP address range for a secondary GMSN subnet. The user interface 500 may also include one or more boxes 516 for providing an indication of the installation of mobility as a service (MAAS) services for the edge site. In some instances, one or more of the boxes of the user interface 500 may be pre-populated with information or data obtained from network databases 104 associated with networks 102 available through the edge site. For example, upon providing the CLLI code for the edge site, the edge compute configuration tool 106 may access one or more network databases 104 to obtain associated management subnet IP addresses and display the retrieved information in the user interface 500. Such information may or may not be editable by a user of the interface 500 once populated. In another example, the edge compute configuration tool 106 may obtain site specific information or data from the data source 120 of the tool. In general, any information displayed via the user interface 500 may be pre-populated by the edge compute configuration tool 106 based on information obtained from one or more databases. Information provided in the boxes 502-516 of the user interface 500 may be received and processed or stored by the edge compute configuration tool 106 through selection of a "Create site" button 518.

Figure 6:
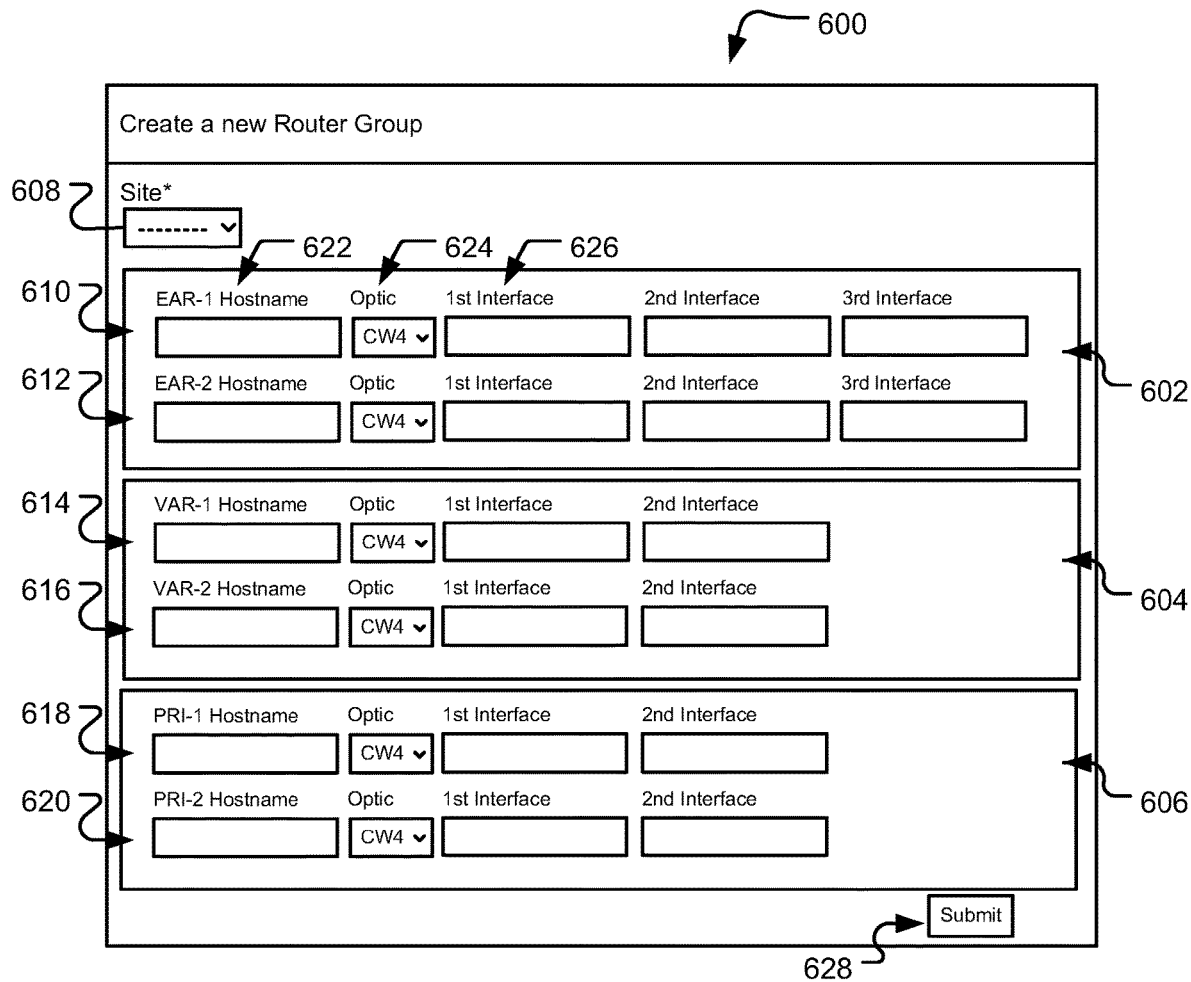
FIG. 6 is an example user interface for providing new router group seeding data and information for an edge compute environment configuration in accordance with one embodiment.

In another example and upon selection of the Add PE's button 406 illustrated in the user interface 400 of FIG. 4, the user interface 124 may display screenshot 600 as illustrated in FIG. 6 and which includes one or more information boxes through which information for adding a provider edge or other edge device to the indicated edge site may be input. As mentioned above with reference to FIG. 2, an edge site may include one or more edge devices 202a-c that provide an interface for components of the edge site and the broader network 102. Further, various networks 102 accessible through the edge site may include different edge devices 202. New PE screen 600, also referred to as "New Router Group" screen, may include one or more boxes for a user or a computing device to enter identification information for edge devices 202 of the edge site. In one particular instance as shown in FIG. 6, the user interface 600 may include a drop-down menu 608 for selecting a previously entered site identifier, such as through new site screen 500 discussed above. Upon selection of a site, one or more boxes for entering edge device information may be presented in the user interface 600. In one instance, a first portion 602 of the user interface 600 may be displayed for entering information for edge devices of a first network 102a, a second portion 604 may be displayed for entering information for edge devices of a second network 102b, and a third portion 606 may be displayed for entering information for edge devices of a third network 102c. More or fewer such portions 602-606 may be included in the user interface 600 corresponding to the networks available at the selected edge site.

For each available network 602-606, information may be entered associated with edge devices 202 of a corresponding network 102 indicated through the selected site 608. In some instances, each available network 102 may include two edge devices at the edge site for redundancy and load balancing to the associated network. Thus, the first portion 602 may include entry boxes 610 for a first edge device and entry boxes 612 for a second edge device associated with network A 102a, second portion 604 may include entry boxes 614 for a first edge device and entry boxes 616 for a second edge device associated with network B 102b, and third portion 606 may include entry boxes 618 for a first edge device and entry boxes 620 for a second edge device associated with network C 102c. For each edge device, the user interface 600 may include boxes or drop-down menus for receiving or displaying information associated with the corresponding edge device. Further, the boxes illustrated may vary depending upon a network database from which device information is obtained. For example, section 602 may be associated with network A 102a, which has a first type of edge device (designated as "EAR" devices herein) at the network edge. The edge compute configuration tool 106 may obtain the type of edge device used by network A 102a and, based on identifying the edge device type, populate section 602 with input boxes that correspond to the identified edge device type for that network. In a similar manner, the edge compute configuration tool 106 may identify a different edge device for network 102b (designated as "VAR" devices herein) and, based on obtaining the identification of the edge device type from network database 104b, may populate section 604 with input boxes that may differ than the input boxes of section 602. Thus, the labels and input boxes presented in screenshot 600 may be determined and generated by the edge compute configuration tool 106 based on edge device information obtained from the corresponding network database 104.

In one example of section 602 of the screenshot 600, a hostname box 622 is provided for entering or displaying a hostname for the corresponding edge device, a drop-down menu 624 for selecting a connection type, and one or more interface boxes 626 may be provided for entering or displaying interface information for the corresponding edge device. Upon entry of information or data for one or more of the edge devices of the edge compute system 200 (including edge devices from the various networks 102 connected to the edge site), a user or computing device may submit the information to the edge compute configuration tool 106 through selection of a submit button 628. The edge compute configuration tool 106 may then store the received information in the data source 120 for use in generating an edge compute configuration process as explained in more detail below.

Figure 7:
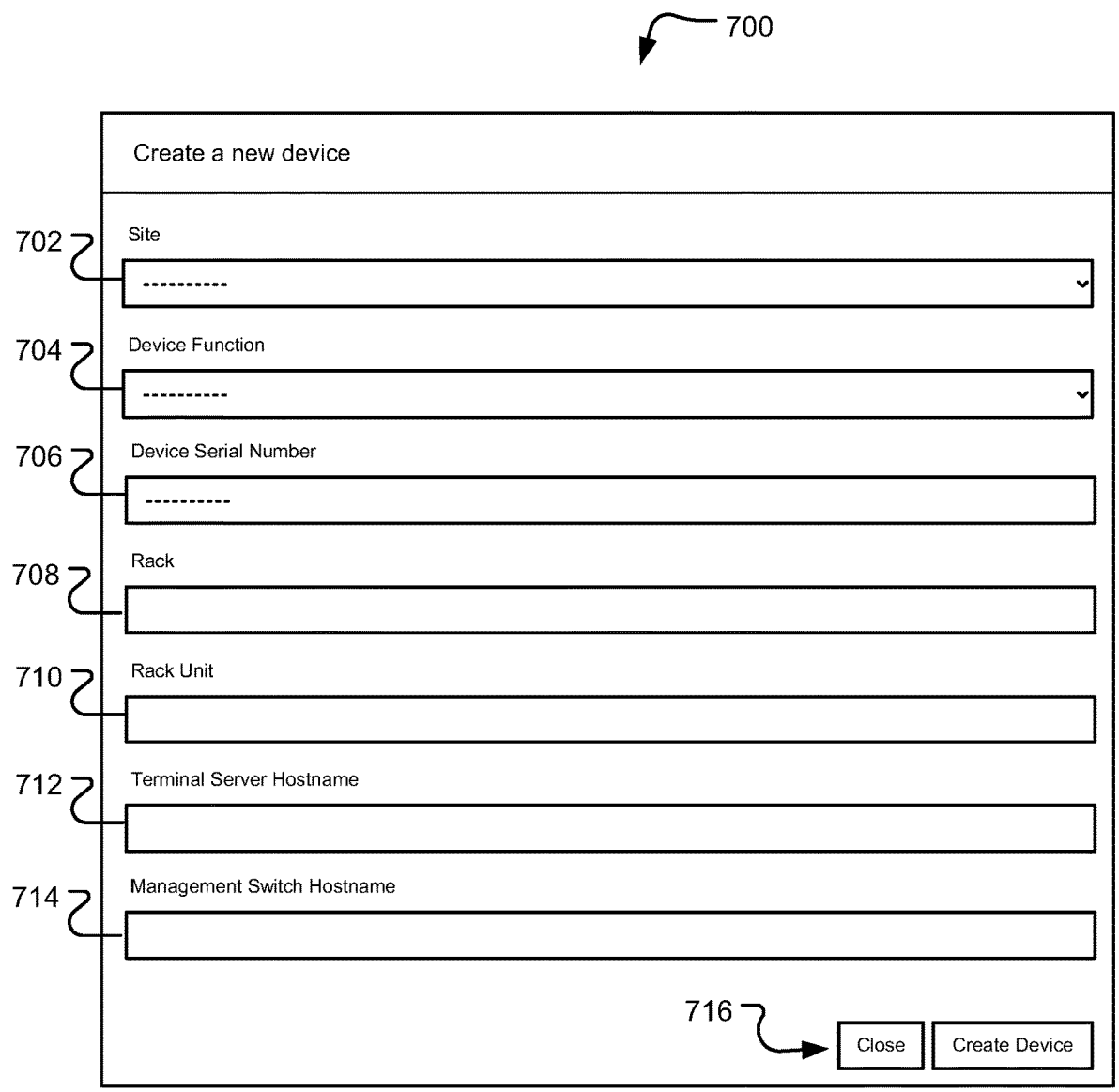
FIG. 7 is an example user interface for providing new device seeding data and information for an edge compute environment configuration in accordance with one embodiment.

In addition to providing site information and edge device information, the user interface may be utilized to provide device information to the edge compute configuration tool 106 for inclusion in an edge compute environment 200. In particular, FIG. 7 is an example user interface 700 for providing new device seeding data and information for an edge compute environment configuration in accordance with one embodiment. Similar to the information provided above, the new device information may be received by the edge compute configuration tool 106 via the user interface 124 and stored in the data source 120 for use in generating an edge compute configuration process. In the example user interface 700 shown, a user or computing device may provide or select a site identifier 702 through a drop down menu or entry box. Other device specific information may also be provided, such as a function 704 of the device to be added (in some instances selectable from a drop-down listing of functions, a serial number 706 associated with the device to be added, a rack identifier 708 identifying a rack at the edge site in which the device may be located, a rack unit identifier 710 at which the device is located in the edge site, a terminal server hostname 712 for the device, and/or a management switch hostname 714 associated with the device. Similar to above, one or more of the interfaces for providing information may be pre-populated by the edge compute configuration tool 106 based on other provided information, such as a site identifier 702 and based on information obtained from one or more network databases 104 associated with one or more networks 102. Further, upon selection of a submit button 716, the entered information of the new device may be provided to the edge compute configuration tool 106 for storage in the data source 120.

Returning now to FIG. 3, the edge compute configuration tool 106 may, in operation 304, determine one or more configuration templates to use in configuring an edge compute environment based on the information provided above via the user interface 124. In one example, one or more configuration templates corresponding to devices of an edge compute environment 200 may be stored in the data source 120 or database 104 associated with a network 102. The configuration templates provide a generalized process for configuring a network device to perform a defined function. The configuration templates may receive as input information or data associated with a device to be configured, such as that information provided above via the user interface 124. For example, a switch may be configured with an IP address based on switch identification information provided via the user interface 124 or from information stored in a network database 104. The edge compute configuration tool 106 may identify one or more such configuration templates from a group of stored configuration templates for use in building a configuration process for the edge compute environment 200. For example, the edge compute configuration tool 106 may use the seed data to identify a manufacturer of a device or a device type and select a configuration template associated with that device type for use in building the configuration process.

In operation 306, the edge compute configuration tool 106 may generate the configuration process, which may include one or more executable files, to configure the devices of the edge compute environment 200 based on the obtained templates, seed information, and/or system variables. The configuration process may configure or otherwise "build" one or more components or systems of the environment 200, such as servers 208, spine switches 204, host leafs 206, and the like to process data packets according to the received information and provide compute services to customers connected to the edge devices. For example, the configuration process may upload or alter firmware or an operating system program of a device of the edge compute environment 200. The firmware/operating system program may configure the device according to the template, such as by making communication ports open and available, establishing a network address (such as an IP address) for the device, populating routing tables and/or communication paths through and between devices, and the like. To execute the configuration process, the edge compute configuration tool 106 may perform one or more steps to request or provision port assignments for components of the environment 200 for communications between the devices. In another example, the configuration process may call a Dynamic Host Configuration Protocol (DCHP) routine that assigns one or more IP addresses or other network configuration parameters to the components of the edge compute environment 200. Also, as explained in more detail below, the configuration process may include instructions to the devices of the environment 200 to report or provide status updates, notices of changes to configurations, check-ins, and other reporting process, including but not limited to information obtained through domain name server records, simple network management protocol, network time protocol, syslog, and/or terminal access controller access control system. In some instances, some steps of the configuration process may wait or be paused until the edge compute configuration tool 106 receives notification of completion of a prior configuration step from one or more of the edge compute devices. In general, any configuration process or operation used to prepare a device of the edge compute environment 200 may be automated by the configuration process generated by the edge compute configuration tool 106.

In one particular implementation, the configuration process may include calls to one or more micro-services maintained and/or managed by micro-services manager 114 of the edge compute configuration tool 106. In general, micro-services may include small, containerized, REST-based API services used to interface with various external systems, such as the devices of the edge environment 200 being configured. Thus, in operation 308, the edge compute configuration tool 106 may call one or more micro-services to execute at least a portion of the generated configuration process. Such micro-services may be utilized to provide zero touch provisioning of the components of the edge compute environment 200, thereby removing the need for a network administrator to accomplish each step of the configuration process. The micro-services may communicate with one or more of the devices of the edge compute environment 200 to instruct or control the devices to perform an operation of the configuration process, including accessing the corresponding device, translating a step of the configuration process into a language used for communicating with the corresponding device, and transmitting the translated step to the device. Through the micro-services, one or more of the steps of the configuration plan may be executed on the devices of the edge compute environment 200.

As mentioned above, one aspect of the configuration process generated by the edge compute configuration tool 106 includes instructing a device of the environment 200 to report a status of the configuration step at the device, including a successful configuration or a failed configuration. As such, in operation 310, the edge compute configuration tool 106 may receive a report from a configured device and, based on the report, determine completion or failure of a configuration step of the configuration process. In some instances, the configuration step may be controlled or executed utilizing a micro-service call. In addition, the edge compute configuration tool 106 may report the determined success or failure of the configuration step to the user interface 124 for display on the computing device 122. Display of the status of the configuration of devices of the edge compute environment 200 is discussed in more detail below with respect to FIGS. 8-12.

In operation 312, the edge compute configuration tool 106 may determine if additional devices of the edge compute environment 200 is to be configured. For example, the above operations may be executed to configure a first switch of the edge compute environment 200 and receive a response from the first switch that the configuration is successful. The edge compute configuration tool 106 may then determine, based on the configuration process, that a second switch device is also to be configured. If the edge compute configuration tool 106 determined more devices of the environment 200 is to be configured, another micro-service may be called or executed in operation 308 to perform the additional environment 200 configuration. If no additional devices of the environment 200 are to be configured, the edge compute configuration tool 106 may report the success or failure of the configuration of the edge compute environment 200 to the user interface for display on a computing device 122.

Through the method 300 of FIG. 3, the edge compute configuration tool 106 may automatically configure the devices or components of the edge compute environment 200 for use by customers to the edge site. In particular, upon entry of the seed information identifying the devices for configuration, the edge compute configuration tool 106 may generate and execute, via micro-services in some instances, a configuration process that prepares communications between the devices and allows for the environment 200 to provide compute services to customers connected or otherwise in communication with the edge compute environment. The edge compute configuration tool 106 may therefore eliminate or reduce instances of mistakes in configuring the devices and improve the time consumed to make edge compute services available from the edge site. For example, the edge compute configuration tool 106 may remove the need for multiple network administrators or technicians to configure the various components separately. Rather, compute services may be provided to customers of the edge site through the configuration process described herein in a fast and efficient manner.

Figure 8:
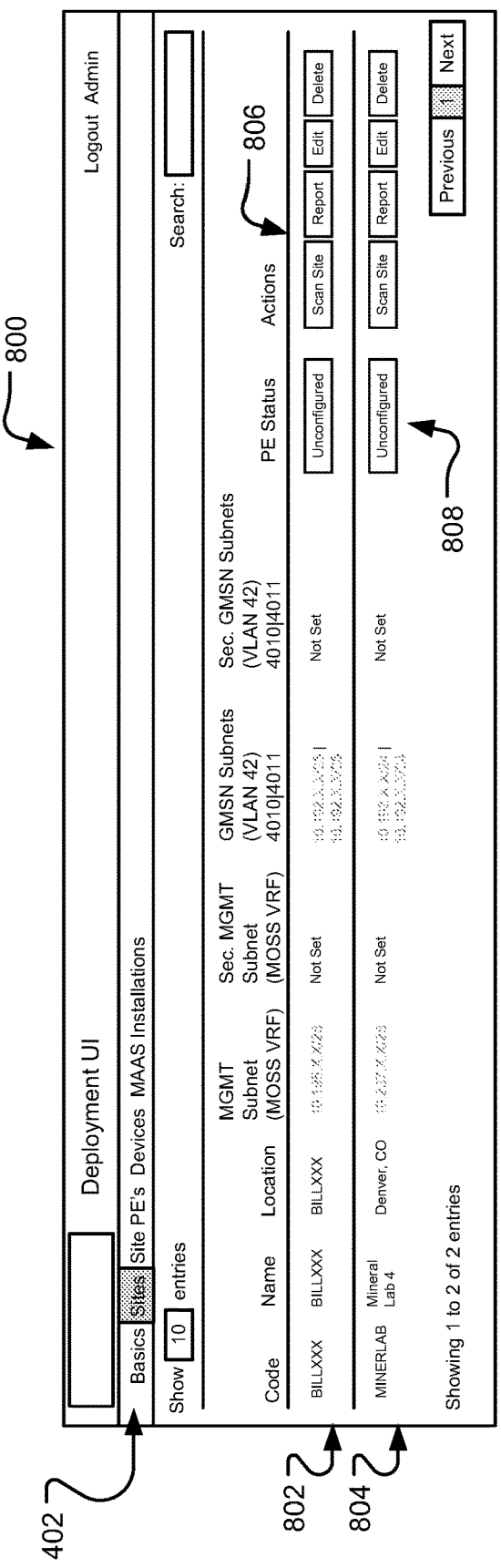
FIG. 8 is an example user interface displaying site data and configuration progress for an edge compute environment configuration in accordance with one embodiment.

As discussed above, the user interface 124 may display information on the status and/or progress results of aspects of the configuration process for an edge compute environment 200. For example, FIG. 8 is an example user interface 800 displaying site data and configuration progress for an edge compute environment configuration in accordance with one embodiment. In one instance, the user interface 800 may be accessed through selection of a "Sites" tab from the control tabs 402 of the interface. Upon selection, the user interface 800 may display site information for sites entered via the New Site interface 500 discussed above. In the example shown, site information for a first site 802 and a second site 804 is illustrated. The site information may include, but is not limited to, a site CLLI code, a site name, a geographical location identifier, management subnet IP addresses for accessing or otherwise communicating with devices of the site, secondary management subnet IP addresses, GMSN subnet IP addresses, and secondary GMSN subnet IP addresses, among others. Such information may be provided to the user interface 124 via the New Site interface 500 discussed above. In one instance, the site information 802-804 may include a status 808 of edge devices located at the edge site. For example, the user interface 800 may include an "unconfigured" status for devices, such as a provider edge device, of the site. Further, the user interface 800 may include one or more action buttons 806 that allow actions to be performed on the site information. For example, the action buttons 806 may allow for editing or deletion of the site information. In another example, selection of a "scan site" action button 806 may cause generation of one or more instructions to scan or communicate with devices at the edge site to ping the devices, request operational information from the devices, and update the site information. Such instructions may cause the known devices of the edge site to generate an operational status report and transmit the report to the edge compute configuration tool 106, which may process the status reports and update the site information displayed in the user interface 800 accordingly.

In some instances, information corresponding to feedback from the devices during a configuration of the edge compute environment 200 may be included in the user interface 800. For example, aspects of the site information 802-804 may be color coded to indicate verified information (perhaps illustrated in a green color) and unverified information (perhaps illustrated in a red color). As shown in FIG. 8, IP addresses of subnets of the site may be verified and displayed in green to illustrate the verified status of the IP addresses, while unverified IP addresses may be displayed in red. Verification of the site information 802-804 may be based on one or more reports of configuration status and/or operational status of devices of the edge site, including devices of the edge compute environment 200. Actions may be taken on the components based on the information in the report to verify the site information 802-804, in some instances.

Figure 9:
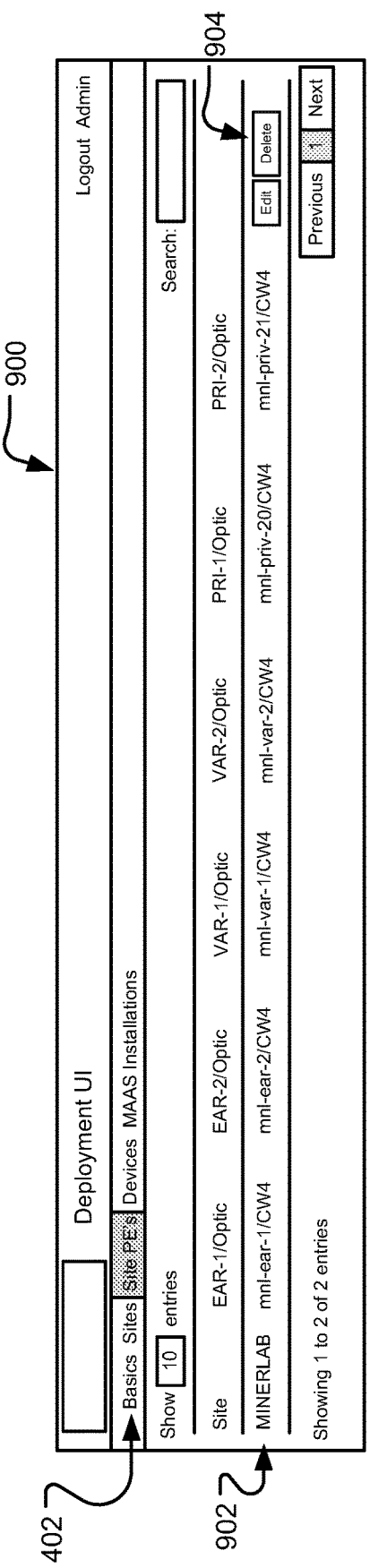
FIG. 9 is an example user interface displaying edge device data and configuration progress for an edge compute environment configuration in accordance with one embodiment.

A similar interface 900 may be displayed by the user interface for edge devices of the edge site. In particular, FIG. 9 is an example user interface 900 displaying edge device information accessed through selection of a "Site PE's" tab from the control tabs 402 of the interface. Upon selection, the user interface 900 may display site information for edge devices at selected sites entered via the New Router Group interface 600 discussed above. In the example shown, edge device information 902 for a selected site is illustrated. The edge device information 902 may include, but is not limited to, an edge device identifier and a connection type for each edge device associated with the selected site. Such information may be provided via the New Router Group interface 600 discussed above. In one instance, the user interface 900 may also include one or more action buttons 904 that allow actions to be performed on the edge device information, such as editing or deletion of the edge device information.

Figure 10:
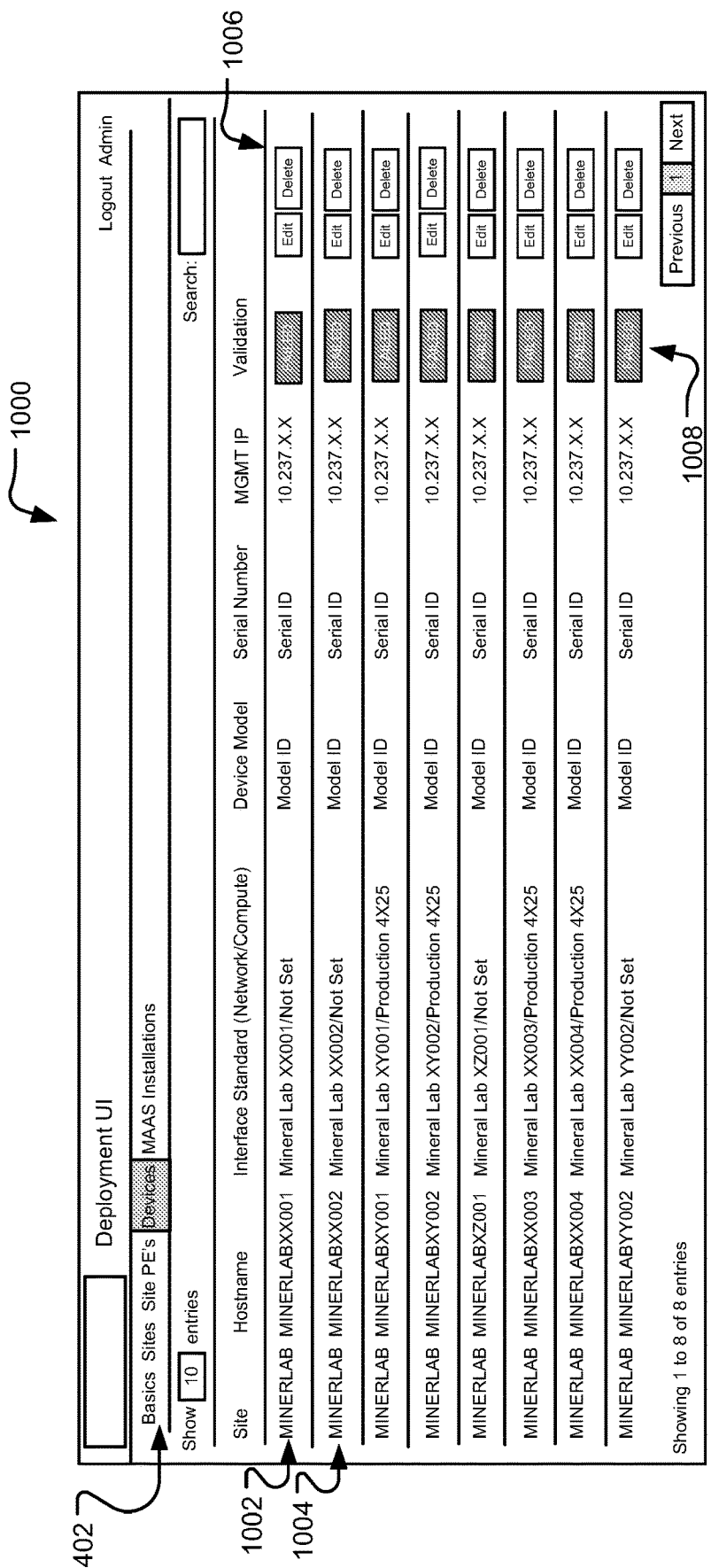
FIG. 10 is an example user interface displaying data and configuration progress for multiple devices of an edge compute environment configuration in accordance with one embodiment.

Selection of the "Devices" tab from the control tabs 402 may cause display of the user interface 1000 of FIG. 10, providing information associated with devices of the edge compute environment 200 of one or more edge sites. Similar to above, the user interface 1000 may display device information for devices of the environment 200 entered via the New Device interface 700 discussed above. In the example shown, device information 1002-1004 for multiple devices of an edge site is illustrated. The device information 1002-1004 may include, but is not limited to, an edge site identifier, a hostname of the device, an interface standard for communicating with the device, a device model identifier, a serial number or identifier of the device, and/or a management IP address for accessing the device. In one instance, the user interface 1000 may also include one or more action buttons 1006 that allow actions to be performed on the device information, such as editing or deletion of the device information.

In some instances, information corresponding to feedback from the devices during a configuration of the edge compute environment 200 may be included in the user interface 1000. For example, aspects of the device information 1002-1004, such as a management IP address associated with the device, may be color coded to indicate verified information (perhaps illustrated in a green color) and unverified information (perhaps illustrated in a red color). Other verification of the device information may be based on one or more reports of configuration status and/or operational status of devices of the edge site, including devices of the edge compute environment 200 and may be displayed as verified or failed 1008.

Figure 11:
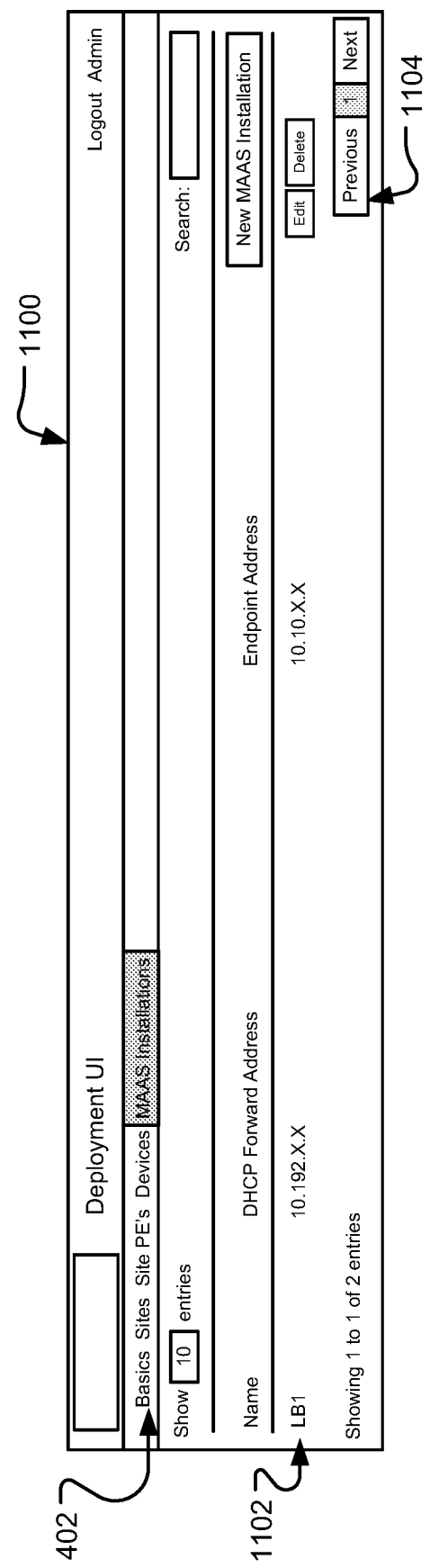
FIG. 11 is an example user interface displaying data and configuration progress for a service installation of an edge compute environment configuration in accordance with one embodiment.

A similar interface 1100 may be displayed by the user interface for MAAS installations of the edge site. In particular, FIG. 11 is an example user interface 1100 displaying MAAS installations information accessed through selection of a "MAAS Installations" tab from the control tabs 402 of the interface. Upon selection, the user interface 1100 may display information for MAAS installations at an edge site. In the example shown, MAAS installations information 1102 for a selected site is illustrated. The MAAS installations information may include, but is not limited to, an MAAS installation identifier, a DCHP forward IP address, and an endpoint IP address. In one instance, the user interface 1100 may also include one or more action buttons 1104 that allow actions to be performed on the MAAS installations information, such as editing or deletion of the MAAS installations information.

A user interface 1200 illustrating interface standards utilized by an edge compute environment 200 may also be displayed. For example, selection of the "Interface Standards" tab from the control tabs 402 may cause display of the user interface 1200 of FIG. 12, providing information associated with interface standard of the devices configured in an edge compute environment 200 of one or more edge sites. In the example shown in FIG. 12, interface standard information 1202-1204 may be illustrated and associated with devices of the edge compute environment 200 which may include, but is not limited to, a function of a device using the interface standard, a device interface identifier, a remote interface identifier, a remote function for the standard, and the like. In one instance, the user interface 1200 may also include one or more action buttons 1206 that allow actions to be performed on the interface information, such as editing or deletion of the interface information.

Figure 13:
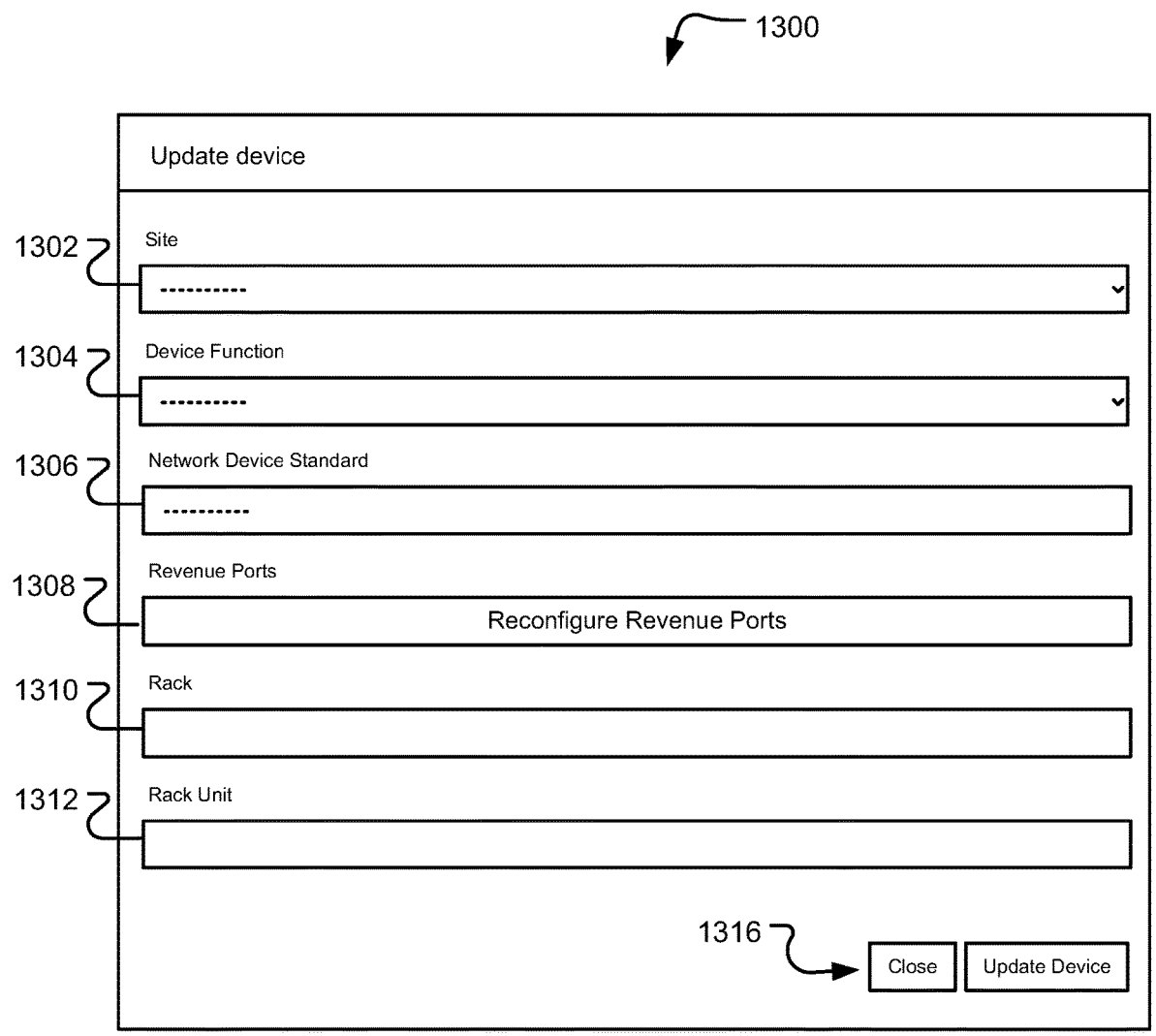
FIG. 13 is an example user interface for providing data and information for updating a device configuration for an edge compute environment in accordance with one embodiment.

In addition to adding and configuring new devices in an edge compute environment of the network, the edge compute configuration tool may also provide and/or display a user interface for providing data and information for updating a device configuration for an edge compute environment. An example of such a user interface is illustrated in FIG. 13. Similar to the information provided above, the update device information may be received by the edge compute configuration tool 106 via the user interface 124 and stored in the data source 120 for use in generating an edge compute configuration process. In the example user interface 1300 shown, a user or computing device may provide or select a site identifier 1302 through a drop down menu or entry box. Other device specific information may also be provided to aid in identifying the device to be updated, such as a device function 1304 (in some instances selectable from a drop-down listing of functions), and a network device standard 1306 corresponding to the device to be updated. A rack location 1310 and/or rack unit identifier 1312 may also be provided. Upon selection of a submit button 716, the entered information of the new device may be provided to the edge compute configuration tool 106 for storage in the data source 120 for updating the information associated with a network device.

As the user interface 1300 of FIG. 13 may be used for an existing device already configured into the edge compute network, one or more of the ports associated with the device may be configured when the device is added to the edge compute environment. However, the user interface 1300 may provide for reconfiguring the ports of the identified device through the reconfigure revenue ports selection button 1308 of the interface. Selection of the reconfigure revenue ports button 1308 may cause the computing device 122 to display user interface 1400 of FIG. 14 to receive port configuration information of a deployed edge compute device. In particular, FIG. 14 is an example user interface 1400 for providing port configuration data and information for a device of an edge compute environment configuration in accordance with one embodiment. Similar to the user interfaces above, the edge compute configuration tool 106 may provide and/or display the user interface 1400 for displaying and/or updating a port configuration for a device of an edge compute environment. As such, the user interface 1400 may include a first section 1402 providing information on a current port configuration for an existing edge compute environment. The existing port configuration section 1402 may include an identification 1404 of the edge compute environment and a summary of the port configuration for the site 1406, including a port configuration type, a starting port value, and a number of ports included in the port configuration. In the example illustrated in FIG. 14, the edge compute environment includes a port configuration type A that starts at port value 0 and includes 8 ports. The port configuration for the edge compute environment may be edited through the user interface 1400 through an "Edit" button or may be deleted through a "Delete" button. An interface map portion 1410 of the user interface 1400 may also be displayed that provides particular information for the individual ports configured for the edge compute environment. Such information may include an interface identifier, the configuration type, and a location identifier of the port, such as a chassis number, rack identifier, device identifier, and the like. More or less port information may be displayed in the user interface 1400 for use by a user of the interface.

In addition to the port summary information, additional or supplemental port configurations may be selected through a port selection portion 1408 of the user interface 1400. For example, a user may delete configuration type A from the existing port configuration illustrated in portion 1402 and select to add another port configuration type from port selection portion 1408. In another example, a user may simply select to add an additional port configuration type from the port selection portion 1408 to add to the edge compute environment identified in the user interface 1400. In this manner and through the user interface 1400, the port configuration for the edge compute environment may be configured or edited.

In some instances, the configuration types listed in the user interface 1400 may be based on the types of devices added to the edge compute environment. For example, the configuration types available for a compute device selected for inclusion in the edge compute environment may be different than configuration types available for a storage device as those devices are configured to perform different operations for the edge compute environment. The selection of the available configuration types made available for inclusion in the edge compute environment may be executed or performed by the edge compute configuration tool 106. For example, the edge compute configuration tool 106 may store a plurality of port configuration types cross-referenced to edge compute devices, such as compute-based devices, storage-based devices, network-based devices, and the like. Upon addition of a particular type of device for inclusion in the edge compute environment, the edge compute configuration tool 106 may determine which port configuration types correlate to the selected devices for population of the configuration selection portion 1408 of the user interface 1400.

In still further instances, the edge compute configuration tool 106 may also automatically configure one or more ports of the selected devices. For example, the edge compute configuration tool 106 may determine that a particular configuration type correlates to a selected device for the edge compute environment and apply the determined configuration type to configure the ports of the identified device. Such application of the configuration may also include configuring one or more ports of other devices of the network, such as upstream devices of a network connected to the edge compute environment. The configuration of the ports may also include requesting one or more interface identifiers for the ports and maintaining or storing the port configuration information, such as in the data source 120. In this manner, the edge compute configuration tool 106 may automatically configure one or more ports of the devices of the edge compute environment based on the type of devices selected for inclusion in the edge compute environment. The port configuration flexibility provides for an edge compute environment in which all types of devices, such as compute devices and storage devices, may be located within the same rack of the edge compute environment and which are automatically configured with one or more port configurations.

Figure 15:
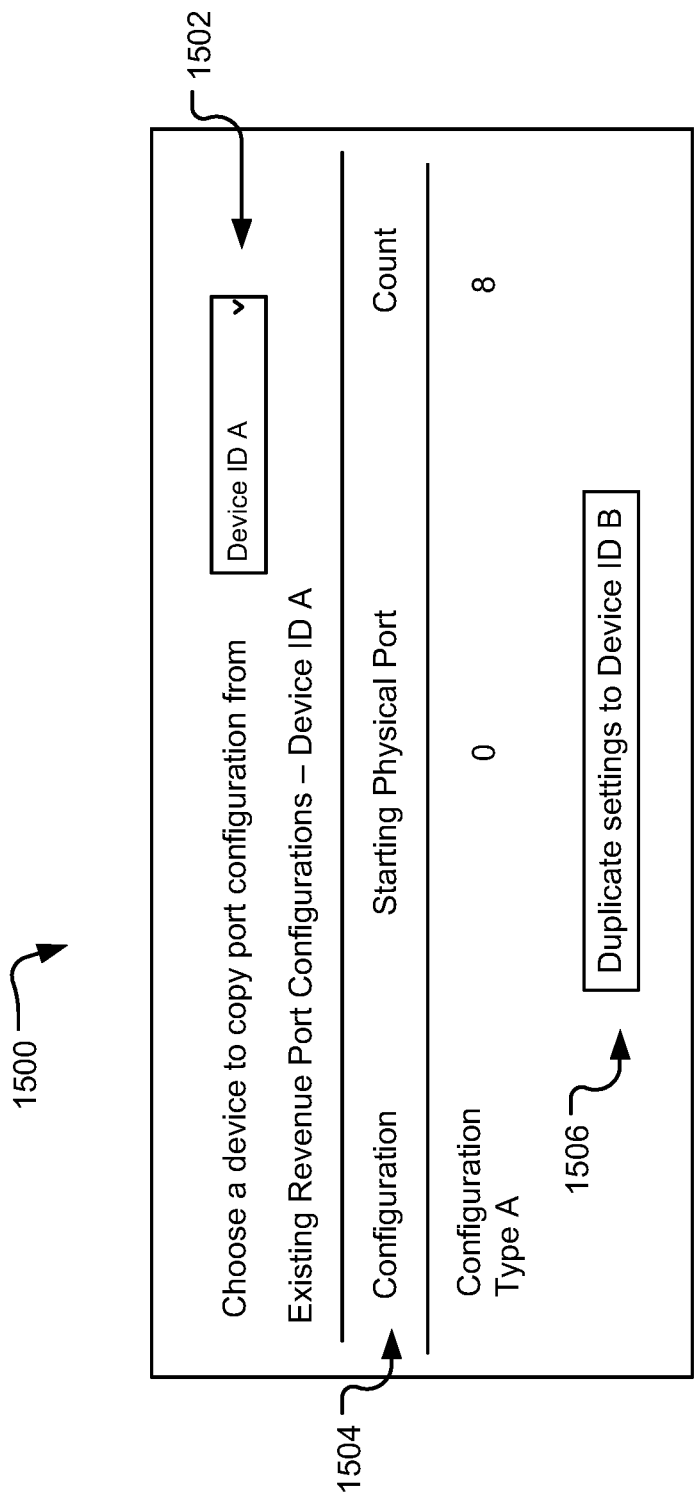
FIG. 15 is an example user interface for importing an existing port configuration from one device of an edge compute environment to another device of the edge compute environment in accordance with one embodiment.

The user interface also provides a mechanism through which a port configuration may be copied from one device of the edge compute environment to another device. In particular, FIG. 15 is an example user interface 1500 for importing an existing port configuration from one device of an edge compute environment to another device of the edge compute environment in accordance with one embodiment. The user interface 1500 includes a drop-down menu 1502 through which a particular device of an edge compute environment may be selected for copying. Upon selection, the port configuration for the selected device may be displayed 1504 for verification by a user of the user interface. A duplicate settings button 1506 may also be included that, upon activation, causes the port configuration of the selected device 1502 to be imported to a second device, such as device B. The user interface 1500 of FIG. 15 may thus be launched in response to a selection of button 1308 of user interface 1300 such that the device to which the port configuration is to be duplicated is known by the edge compute configuration tool 106. Through the user interface 1500, the port configuration of another edge compute environment device may be imported or duplicated to another edge compute environment device to reduce the port configuration operations performed by a user of the edge compute configuration tool 106.

Figure 16:
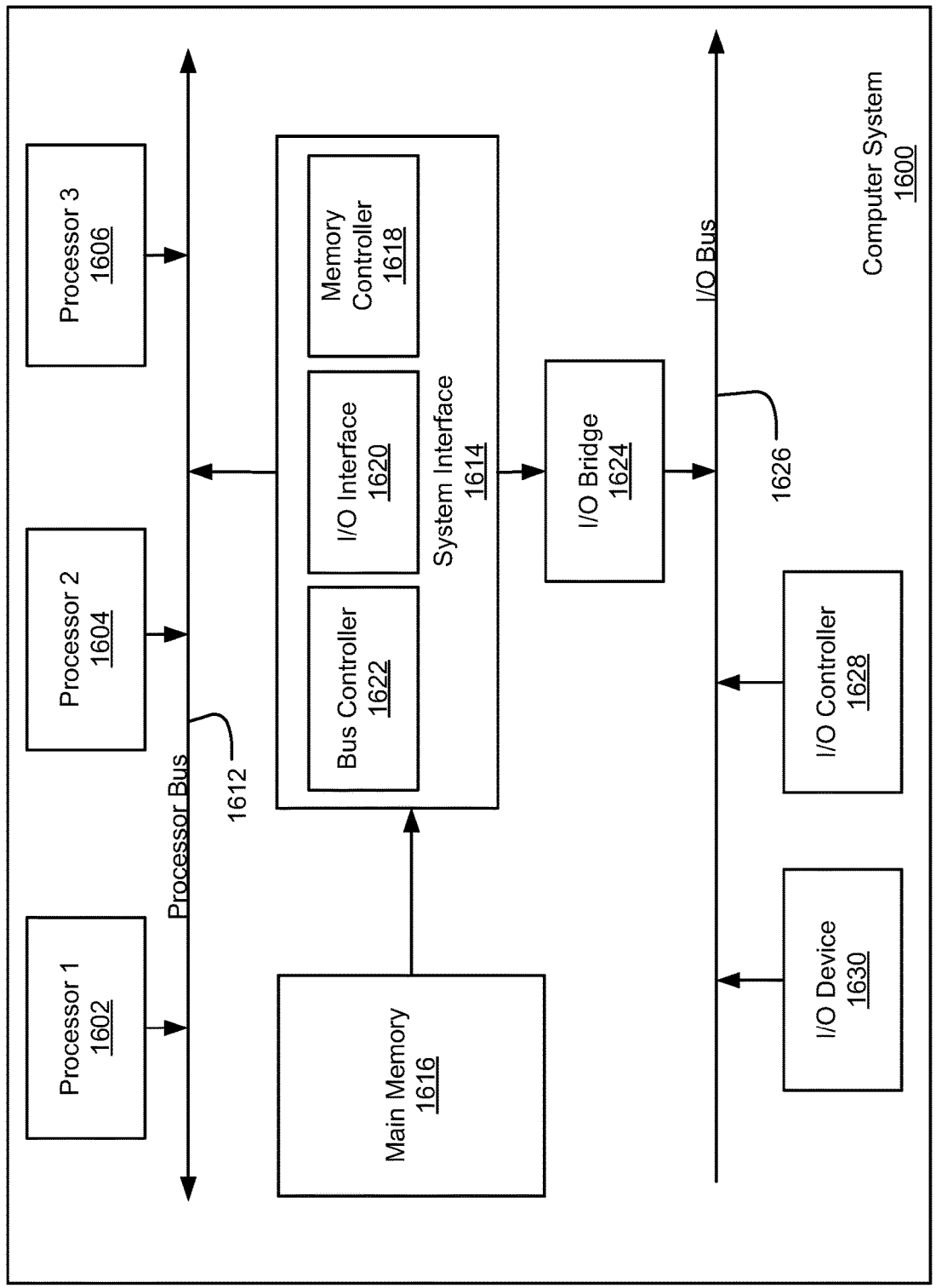
FIG. 16 is a diagram illustrating an example of a computing system which may be used in implementing embodiments of the present disclosure.

FIG. 16 is a block diagram illustrating an example of a computing device or computer system 1600 which may be used in implementing the embodiments of the components of the network disclosed above. For example, the computing system 1600 of FIG. 16 may be the computing device 122 discussed above. The computer system (system) includes one or more processors 1602-1606. Processors 1602-1606 may include one or more internal levels of cache (not shown) and a bus controller or bus interface unit to direct interaction with the processor bus 1612. Processor bus 1612, also known as the host bus or the front side bus, may be used to couple the processors 1602-1606 with the system interface 1614. System interface 1614 may be connected to the processor bus 1612 to interface other components of the system 1600 with the processor bus 1612. For example, system interface 1614 may include a memory controller 1618 for interfacing a main memory 1616 with the processor bus 1612. The main memory 1616 typically includes one or more memory cards and a control circuit (not shown). System interface 1614 may also include an input/output (I/O) interface 1620 to interface one or more I/O bridges or I/O devices with the processor bus 1612. One or more I/O controllers and/or I/O devices may be connected with the I/O bus 1626, such as I/O controller 1628 and I/O device 1630, as illustrated.

I/O device 1630 may also include an input device (not shown), such as an alphanumeric input device, including alphanumeric and other keys for communicating information and/or command selections to the processors 1602-1606. Another type of user input device includes cursor control, such as a mouse, a trackball, or cursor direction keys for communicating direction information and command selections to the processors 1602-1606 and for controlling cursor movement on the display device.

System 1600 may include a dynamic storage device, referred to as main memory 1616, or a random access memory (RAM) or other computer-readable devices coupled to the processor bus 1612 for storing information and instructions to be executed by the processors 1602-1606. Main memory 1616 also may be used for storing temporary variables or other intermediate information during execution of instructions by the processors 1602-1606. System 1600 may include a read only memory (ROM) and/or other static storage device coupled to the processor bus 1612 for storing static information and instructions for the processors 1602-1606. The system set forth in FIG. 16 is but one possible example of a computer system that may employ or be configured in accordance with aspects of the present disclosure.

According to one embodiment, the above techniques may be performed by computer system 1600 in response to processor 1604 executing one or more sequences of one or more instructions contained in main memory 1616. These instructions may be read into main memory 1616 from another machine-readable medium, such as a storage device. Execution of the sequences of instructions contained in main memory 1616 may cause processors 1602-1606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available through a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 1616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

We claim:

1. A method for managing a communications network, the method comprising:
    obtaining site information associated with an edge site of the communications network;
    generating, based on the site information associated with the edge site of the communications network, a configuration process for instantiating a compute service available from the edge site, the configuration process comprising a set of instructions for configuring an operational status of at least one network edge device of the edge site to provide the compute service to a requesting device in communication with the edge site; and
    configuring, based on the configuration process, the at least one network edge device to provide the compute service.

2. The method of claim 1 wherein configuring the at least one network edge device comprises:
    executing a micro-service to translate the set of instructions and communicate the translated set of instructions to the at least one network edge device.

3. The method of claim 1 wherein the at least one network edge device comprises one of a network gateway device, a spine switch device, a host-leaf switch device, or an application server.

4. The method of claim 1 further comprising:
    receiving, via a user interface displayed on a computing device, additional site information associated with the edge site, the additional site information comprising an interface site identifier, an edge device identifier, or an identifier of the at least one network edge device.

5. The method of claim 4 wherein the additional site information received via the user interface further comprises at least network address associated with the at least one network edge device.

6. The method of claim 4 further comprising:
obtaining and displaying, via the user interface, a plurality of identifiers associated with devices of the edge network of the communications network, a plurality of network addresses each associated with one of the devices of the edge network, and an indication of a validation of the plurality of network addresses.

7. The method of claim 4 further comprising:
obtaining and displaying, via the user interface, a list of ports associated with the devices of the edge network of the communications network and a port configuration type.

8. The method of claim 7 further comprising:
receiving, via the user interface displayed on the computing device, an input to duplicate the port configuration type from the at least one network edge device to a second network edge device; and
configuring, based on the input, at least one port of the second network edge device with the port configuration type.

9. The method of claim 1 wherein generating the configuration process comprises:
obtaining a configuration template comprising a portion of the set of instructions; and
altering the configuration template with the site information.

10. An apparatus comprising:
a processing device; and
a non-transitory computer-readable medium encoded with instructions, which when executed by the processing device, cause the processing device to:
obtain site information associated with an edge site of the communications network;
generate, based on the site information associated with the edge site of the communications network, a configuration process for instantiating a compute service available from the edge site, the configuration process comprising a set of instructions for configuring an operational status of at least one network edge device of the edge site; and
configure, based on the configuration process, the at least one network edge device to provide the compute service.

11. The apparatus of claim 10 wherein the computer executable instructions further cause the processing device to:
execute a micro-service to translate the set of instructions and communicate the translated set of instructions to the at least one network edge device.

12. The apparatus of claim 10 wherein the at least one network edge device comprises one of a network gateway device, a spine switch device, a host-leaf switch device, or an application server.

13. The apparatus of claim 10 wherein the computer executable instructions further cause the processing device to:
receive, via a user interface displayed on a computing device, additional site information associated with the edge site, the additional site information comprising an interface site identifier, an edge device identifier, or an identifier of the at least one network edge device.

14. The apparatus of claim 13 wherein the computer executable instructions further cause the processing device to:
obtain and display, via the user interface, a plurality of identifiers associated with devices of the edge network of the communications network, a plurality of network addresses each associated with one of the devices of the edge network, and an indication of a validation of the plurality of network addresses.

15. The apparatus of claim 13 wherein the computer executable instructions further cause the processing device to:
obtain and display, via the user interface, a list of ports associated with the devices of the edge network of the communications network and a port configuration type.

16. The apparatus of claim 15 wherein the computer executable instructions further cause the processing device to:
receive, via the user interface displayed on the computing device, an input to duplicate the port configuration type from the at least one network edge device to a second network edge device; and
configure, based on the input, at least one port of the second network edge device with the port configuration type.

17. A tangible, non-transitory, computer-readable media having software encoded thereon, the software, when executed by a processor, operable to:
obtain site information associated with an edge site of the communications network;
generate, based on the site information associated with the edge site of the communications network, a configuration process for instantiating a compute service available from the edge site, the configuration process comprising a set of instructions for configuring an operational status of at least one network edge device of the edge site to provide the compute service to a requesting device in communication with the edge site; and
transmit, to the at least one network edge device and based on the configuration process, at least one instruction to configure the at least one network edge device to provide the compute service.

18. The tangible, non-transitory, computer-readable media of claim 17 wherein the software, when executed by the processor, is further operable to:
execute a micro-service to translate the set of instructions and communicate the translated set of instructions to the at least one network edge device.

19. The tangible, non-transitory, computer-readable media of claim 17 wherein the software, when executed by the processor, is further operable to:
receive, via a user interface displayed on a computing device, additional site information associated with the edge site, the additional site information comprising an interface site identifier, an edge device identifier, or an identifier of the at least one network edge device.

20. The tangible, non-transitory, computer-readable media of claim 19 wherein the software, when executed by the processor, is further operable to:
obtain and display, via the user interface, a plurality of identifiers associated with devices of the edge network of the communications network, a plurality of network addresses each associated with one of the devices of the edge network, and an indication of a validation of the plurality of network addresses.

\* \* \* \* \*